Figure 1:
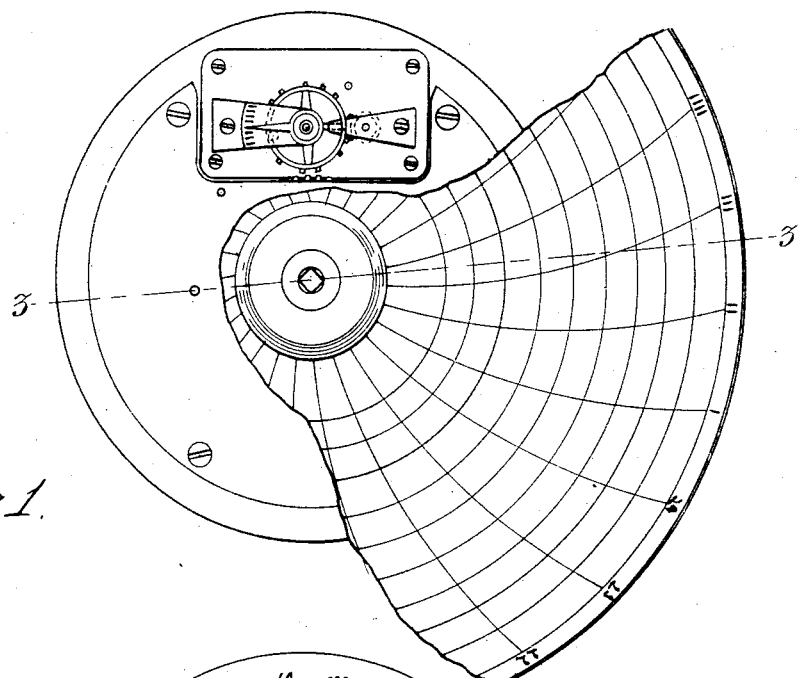

No. 867,732. PATENTED OCT. 8, 1907.
F. A. JONES.
CLOCKWORK FOR RECORDING INSTRUMENTS.
APPLICATION FILED DEC. 19, 1904.

2 SHEETS—SHEET 1.

Witnesses:
H. B. Davis.
Maud M. Piper.

Inventor:
Florentine A. Jones
by Hayes & Harriman,
attys.

No. 867,732. PATENTED OCT. 8, 1907.
F. A. JONES.
CLOCKWORK FOR RECORDING INSTRUMENTS.
APPLICATION FILED DEC. 19, 1904.
2 SHEETS—SHEET 2.
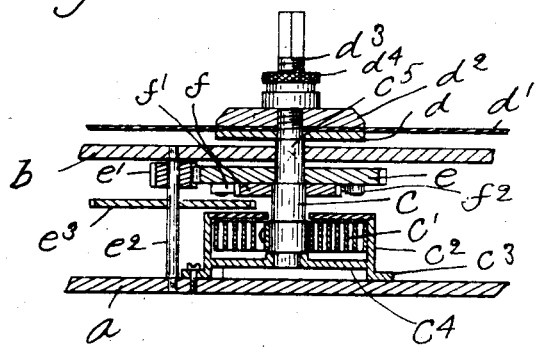
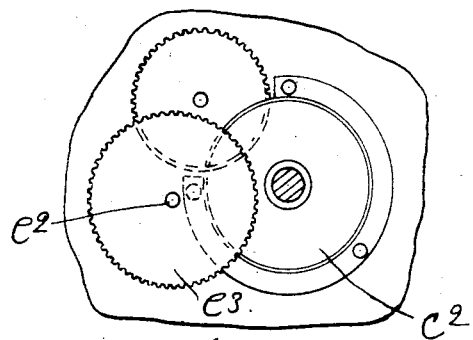
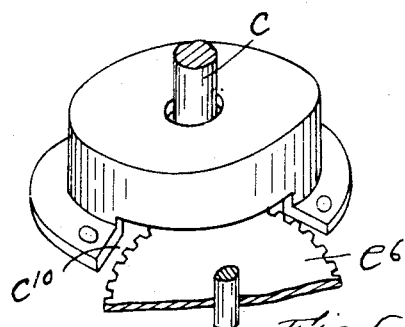
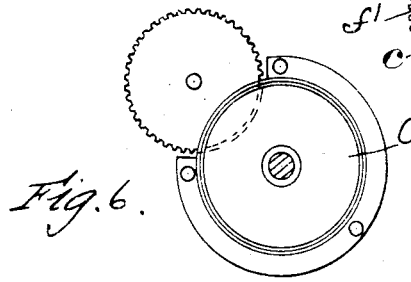
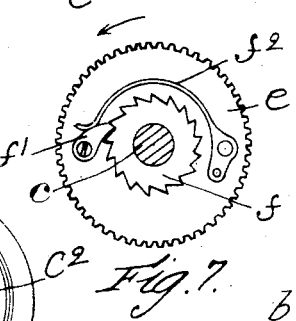
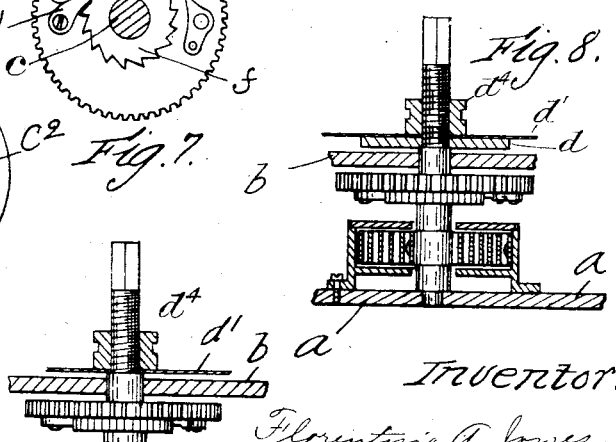
Witnesses:
H. B. Davis.
Maud M. Piper
Inventor:
Florentine A. Jones
by Noyes & Harriman
Attys

UNITED STATES PATENT OFFICE.

FLORENTINE A. JONES, OF BOSTON, MASSACHUSETTS.

CLOCKWORK FOR RECORDING INSTRUMENTS.

No. 867,732.      Specification of Letters Patent.      Patented Oct. 8, 1907.

Application filed December 19, 1904. Serial No. 237,364.

*To all whom it may concern:*

Be it known that I, FLORENTINE A. JONES, of Boston, county of Suffolk, State of Massachusetts, have invented an Improvement in Clockworks for Recording Instruments, of which the following description, in connection with the accompanying drawings, is a specification, like characters on the drawings representing like parts.

This invention relates to recording instruments, and has for its object to improve the construction of the same, so as to insure greater accuracy in the records made by such instruments.

In order to attain the results necessary to insure the greatest accuracy of record in instruments for this purpose, it is necessary to provide a construction which will insure several coördinate results. The chart must be carried by an arbor which is held under the constant tension of a spring, to obviate back lash; and the chart must be fixed to said arbor by pressure, which can be increased by leverage, so as not only to clamp the chart in such a manner as to hold it immovably fixed, but to insure it remaining immovably fixed under all the conditions to which it is practically subjected, whereby long usage, negligence and undue strain will not so wear or injure the securing means as to impair its efficiency. The charts are quite large in diameter, and any back lash or lost motion at its central point of support increases rapidly towards its outer edge and results in a wide variation from a slight cause. Hence the necessity of immovably securing the chart to an arbor of the clock train which is under the constant pressure of its actuating spring, by means, which, in itself will remain immovable under the strain of fixing or unfixing the chart. Therefore the attaching of a chart to any construction of dial wheels or dial-works, so called, cannot effect the object of my invention, or result otherwise than in back-lash or lost motion, which it is of the greatest importance to eliminate in order to secure a correct reading of the chart. That back-lash or lost motion must result from connecting the chart to a dial-wheel is self-evident in view of the fact that all dial wheels are mounted loosely, and are connected to the clock train by pinions and gears, which are not under the constant tension of the actuating spring.

To obtain the objects of this invention with the greatest degree of efficiency, the chart should be affixed to an arbor to which the inner end of its actuating spring is attached, so that while held under the constant tension of said spring there can be no back lash, and as a clock train is employed for regulating the movement of said arbor, I find that the arbor which best fulfils these conditions is the winding or barrel arbor of the clock movement, although some other arbor may more or less afford the necessary conditions. The clock movement which I prefer to employ is adapted to cause one revolution of the chart-carrying arbor in twenty-four hours, and in order to restrict the diameter of the clock movement to such dimensions as will enable it to be used in the smaller sizes of instruments, I have placed the chart-carrying arbor in the center of the movement and arranged certain means by which the outer or fixed end of the mainspring may be supported in such manner as to raise the mainspring a short distance above the bottom plate, to provide for moving one or more of the train wheels in towards the center of the movement, which in certain constructions may be advisable, instead of having the train wheels both placed so as to revolve above the mainspring.

I have secured the chart to the chart-carrying arbor without the intervention of a quill or sleeve, which latter is the usual manner of construction, and which have certain defects which are faulty and cause much annoyance, as for instance, where a wheel and its quill, or a disk having a quill upon which a thread is cut to receive a nut, are employed. In this latter construction it has been found necessary to affix the disk and its quill to the arbor, upon which it is placed, by means of a pin or screw, and when turning the nut up the whole strain comes upon this pin or fixture, causing it to loosen, thereby resulting in more or less back-lash, the same as occurs when the quill is fixed to or is a part of a dial wheel, both of which constructions can be found in previous patents No. 287,685, Oct. 30, 1883, No. 343,177 June 8, 1886, No. 744,203 Nov. 17, 1903, granted to me. Sometimes the quill or nut is held on the arbor by friction. In such case it has been found necessary to provide the disk with slight projections to pierce the paper of the chart and thereby hold it in place. A nut or quill so fixed by friction is effective for but a short time as the wear incidental to repeatedly removing and replacing this nut or quill renders it liable to easily loosen and is therefore ineffective. For these reasons I employ means for securing the chart, constructed on an entirely different principle, which will obviate all the defects liable to occur by undue force or strain in turning the nut, or by wear.

In accordance with my invention I have cut a screw thread directly upon an arbor of the clock-train, upon which the chart securing means is fixed, and as this arbor is a part of the clock-train which resists the force of the actuating-spring, and is at all times held practically fixed in one direction by the tension of said spring, there is no looseness, back-lash or lost motion, and by means of the screw thread it is adapted to receive a nut, and I have provided said arbor, below the bottom of the thread with a shoulder, to resist the action of the nut, and the chart is fixed by turning said nut down tightly, and it will be seen that no matter how hard a person may turn this nut, the force will be entirely exerted upon the arbor. Chart-supporting or clamping-disks if they are desired, may be placed upon the arbor simply friction tight, or they might even be loose, and they would operate properly; for the longitudinal thrust of the nut is resisted by the shoulder on the arbor. When the strain of the nut comes upon a quill forming a part of a disk mounted upon an arbor, then it becomes necessary to fix the quill or disk to the arbor in such a manner that it will not turn with the nut or become loosened by the forcing or straining of the nut after the nut has been turned up sufficiently to fix the chart, and this is a result that I believe has never before been perfectly accomplished; the disk or quill in such case soon becomes loosened by the repeated strain of turning up the nut and any undue force applied to the nut tends to turn the quill on the arbor, as the screw thread upon which the nut is mounted is cut upon the quill and consequently the whole strain comes upon a pin or screw which serves to fix the disk to the arbor, and looseness results, which continually increases until it equals the error of the back-lash which is inherent in all dial-works, or loose wheels.

Figure 2:
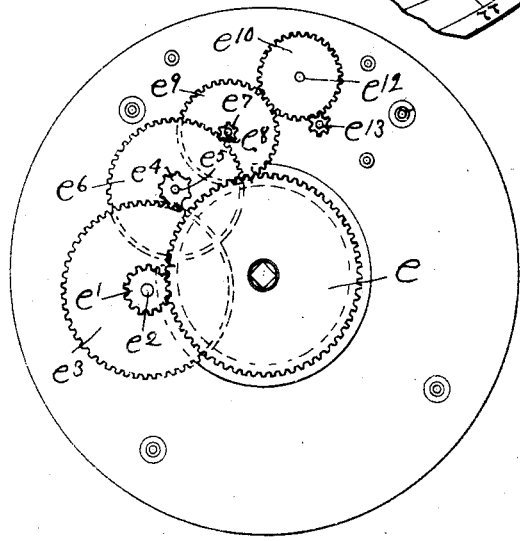

Figure 1. shows in front elevation a recording instrument embodying my invention, a portion of the chart being broken away. Fig. 2, is a front elevation of the clock train which regulates the movement of the chart-carrying arbor, the top plate and chart being removed. Fig. 3. is a vertical section of the recording instrument shown in Fig. 1, taken on the dotted line 3—3. Fig. 4, is a detail showing in plan view the barrel and the first and second train wheels of the clock train. Fig. 5, is a perspective view of the barrel and the second train wheel of the clock train. Fig. 6. is a plan view of the barrel, and the second train wheel of the clock train. Fig. 7. is a detail showing the main wheel of the clock train, and the ratchet wheel and pawl by which said main wheel is driven. Fig. 8 is a detail showing modified means for securing the chart to the chart-carrying arbor, and also modified means of supporting the lower end of said arbor. Fig. 9. is a detail showing another modified means for securing the chart to the chart-carrying arbor.

$a$ and $b$ represent the bottom and top plates of the frame which support the parts.

$c$ represents the chart-carrying arbor, and $c'$ the actuating spring for said arbor, the inner end of which is attached to the arbor so that the arbor is not only driven by said spring, but is held under the constant tension of said spring, so as to prevent back-lash. The chart-carrying arbor $c$ is formed with a shoulder $c^5$ at a point just above the top plate $b$ with which coöperate means employed for securing the chart to the arbor. As shown in Fig. 3 a disk $d$ is placed on the arbor which rests upon said shoulder $c^5$, and the chart $d'$ has a central hole through it whereby it may be placed on the arbor so as to rest upon said disk $d$, and another disk $d^2$ is then placed on the arbor upon the chart $d'$, so that the chart will be held between the two disks $d$ and $d^2$. The upper end portion of the arbor $c$, below the squared end thereof, is screw threaded as shown, at $d^3$, and upon said threaded end portion a nut $d^4$ is turned, which, when turned down hard against the disk $d^2$ firmly presses said disk against the chart on the disk $d$, and presses said disk $d$ against the shoulder $c^5$. The shoulder $c^5$ acts to resist the vertical thrust of the chart holding nut $d^4$ and therefore coöperates therewith in holding the chart in fixed position. The chart is thus fixed directly to one of the regular arbors of the clock-train, as for instance, to the winding-arbor. By thus directly securing the chart to the arbor the danger of loosening is avoided, even when a severe and wholly unnecessary force is applied to the nut; and by securing it to one of the regular arbors of the clock-train, it will be held at all times under the constant tension of the actuating-spring, and hence back-lash is avoided.

In the modification shown in Fig. 8 the disk $d^2$ is omitted, the nut being turned down on the screw thread directly upon the chart.

In the modification shown in Fig. 9 the disk $d$ is also omitted and the chart bears directly upon the shoulder $c^5$ on the arbor. The actuating spring $c'$ which drives the arbor $c$ and which holds it under a constant tension is contained in a barrel $c^2$, which is stationarily supported on the bottom plate $a$ of the frame, and said barrel is lifted above said bottom plate, its cylindrical wall being extended for this purpose, so that the bottom of the barrel occupies a position above the bottom plate $a$, and from the extension of said cylindrical wall a flange $c^3$ projects outwardly, which is adapted to rest upon the bottom plate, screws passing through said flange which enter the plate and thereby stationarily hold the barrel. The bottom plate $c^4$ of the barrel is lifted above the bottom plate $a$ to provide ample space between it and said bottom plate for the projection of one of the train wheels, as will be described. The lower end of the chart-carrying arbor $c$ is journaled in the bottom plate $c^4$ of the barrel, yet in certain cases said arbor may be journaled in the bottom plate $a$, as shown in Fig. 8.

The movement of the chart-carrying arbor is regulated by a clock train, and $e$ represents the main wheel of said train which is mounted loosely on the chart-carrying arbor $c$ and bears a pawl $f'$ which is pressed into engagement with a ratchet wheel $f$ by a spring $f^2$, and the ratchet wheel $f$ is secured to the arbor $c$.

The main wheel $e$ engages a pinion $e'$ secured to an arbor $e^2$, bearing the first train wheel $e^3$, which engages a pinion $e^4$, secured to an arbor $e^5$, bearing the second train wheel $e^6$, which engages a pinion $e^7$ secured to an arbor $e^8$ bearing the third train wheel $e^9$, which engages the fourth wheel $e^{10}$ secured to an arbor $e^{12}$ which engages a pinion $e^{13}$, connected with the escape wheel.

To assemble the train wheels in as compact form as possible and thereby occupy but little space, the arbor $e^2$ is disposed quite close to the stationary barrel $c^2$, and the train wheel $e^3$ borne by it projects over said barrel some little distance, as shown in Fig. 3, thereby occupying a position between the main wheel and the barrel, and the barrel $c^2$ is recessed at one side as at $c^{10}$, see Fig. 5, and the arbor $e^5$ is also located quite close to the barrel $c^2$, and the train wheel $e^6$ projects into said recess. It is obvious that the position of the two train wheels $e^3$ and $e^6$, relative to the barrel, may be reversed or both wheels may be placed above or below the barrel.

The usual center wheel of the clock train is dispensed with, and the chart-carrying arbor $c$ is located at or near the center of the movement, and the main wheel on said arbor subserves all the functions of the usual center wheel, and permits of winding without removing the chart.

Having thus described my invention, what I claim as new and desire to secure by Letters Patent is:—

1. In a recording instrument, a rotatable chart-carrying arbor provided with a shoulder and having a screw thread formed on its end portion and adapted to serve as the winding-arbor, a chart holding nut turned on the threaded end of said arbor, a main spring attached at one end to said arbor for rotating it, and for holding it under constant tension, and a clock train connected with said arbor for regulating its movement, substantially as described.

2. In a recording instrument, a chart-carrying arbor provided with a shoulder for resisting the action of the chart securing means, chart securing means applied to said arbor, a spring for driving said arbor and for holding it under constant tension, a frame having a bottom plate, a stationary barrel containing said spring, which is lifted above the bottom plate of the frame and recessed at one side, and a clock train connected with said arbor for regulating its movement, one of the wheels of which projects into the recess of the barrel, substantially as described.

In testimony whereof, I have signed my name to this specification, in the presence of two subscribing witnesses.

FLORENTINE A. JONES.

Witnesses:
B. J. NOYES,
H. B. DAVIS.